United States Patent
Alduino et al.

(10) Patent No.: US 7,306,378 B2
(45) Date of Patent: Dec. 11, 2007

(54) METHOD AND APPARATUS PROVIDING AN ELECTRICAL-OPTICAL COUPLER

(75) Inventors: Andrew C. Alduino, San Jose, CA (US); Mario J. Paniccia, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 10/840,413

(22) Filed: May 6, 2004

(65) Prior Publication Data

US 2005/0249462 A1 Nov. 10, 2005

(51) Int. Cl.
G02B 6/36 (2006.01)

(52) U.S. Cl. ............................. 385/88; 385/31; 385/52; 385/86; 385/87; 385/92; 385/94; 385/14

(58) Field of Classification Search ................. 385/49, 385/31, 52, 86, 87, 88, 92, 94, 14
See application file for complete search history.

(56) References Cited

U.S. PATENT DOCUMENTS

| | | | |
|---|---|---|---|
| 4,297,653 A | 10/1981 | Scifres et al. | |
| 5,611,008 A | 3/1997 | Yap | |
| 5,671,315 A * | 9/1997 | Tabuchi et al. | 385/88 |
| 5,987,202 A | 11/1999 | Gruenwald et al. | |
| 6,257,772 B1 * | 7/2001 | Nakanishi et al. | 385/88 |
| 6,435,734 B2 * | 8/2002 | Okada et al. | 385/88 |
| 6,869,299 B2 * | 3/2005 | Tanaka et al. | 439/188 |
| 6,987,906 B2 * | 1/2006 | Nakama et al. | 385/31 |
| 7,106,980 B2 * | 9/2006 | Nakanishi et al. | 385/49 |
| 2002/0181853 A1 * | 12/2002 | Ido et al. | 385/19 |
| 2003/0118288 A1 * | 6/2003 | Korenaga et al. | 385/49 |
| 2004/0017977 A1 * | 1/2004 | Lam et al. | 385/49 |
| 2005/0100264 A1 * | 5/2005 | Kim et al. | 385/14 |
| 2005/0249462 A1 | 11/2005 | Alduino et al. | |

FOREIGN PATENT DOCUMENTS

DE 44 11 380 A1 10/1995
EP 0 836 105 A1 4/1998

(Continued)

OTHER PUBLICATIONS

Akahori, Y. et al., "High-Speed Photoreceivers Using Solder Bumps and Microstrip Lines Formed on a Silicon Optical Bench," IEEE Photonics Technology Letters, vol. 11, No. 4, (Apr. 1999), pp. 454-428.

(Continued)

Primary Examiner—Frank G. Font
Assistant Examiner—James P. Hughes
(74) Attorney, Agent, or Firm—Blakely, Sokoloff, Taylor & Zafman LLP (57) ABSTRACT

An electrical-optical coupling device. An apparatus according to an embodiment of the present invention includes a first trench defined in a first semiconductor substrate. A first reflector is defined at a first end of the first trench in the first semiconductor substrate. The first reflector is angled with respect to an axis of the first trench. A first optical fiber is disposed in the first trench at a second end of the first trench. An optical source is mounted to the first semiconductor substrate proximate to the first trench. The optical source is optically coupled to the first optical fiber via the first reflector.

26 Claims, 9 Drawing Sheets

FOREIGN PATENT DOCUMENTS

| EP | 0 611 975 A1 | 4/2005 |
| JP | 08 234063 A | 9/1996 |
| WO | WO 02/077691 A2 | 10/2002 |
| WO | PCT/US2006/011132 | 7/2006 |

OTHER PUBLICATIONS

Park, S., et al., "A Novel Method for Fabrication of a PLC Platform for Hybrid Integration of an Optical Module by Passive Alignment," IEEE Photonics Technology Letters, vol. 14, No. 4, (Apr. 2002), pp. 486-488.

Strandman, C., et al., "Fabrication of 45° Mirrors Together with Well-Defined V-Grooves Using Wet Anisotropic Etching of Silicon," Journal of Microelectromechanical Systems, vol. 4, No. 4, (Dec. 1995), pp. 213-219.

Iwase, M., et al., "Single Mode Fiber MT-RJ SFF Transceiver Module Using Optical Subassembly With a New Shielded Silicon Optical Bench," IEEE Transactions on Advanced Packaging, vol. 24, No. 4, (Nov. 2001), pp. 419-428.

Delpiano, F., et al., "10-Channel Optical Transmitter Module Operating Over 10 Gb/s Based on VCSEL and Hybrid Integrated Silicon Optical Bench," 1999 Electrical Components and Technology Conference, Torino (Italy), pp. 759-762, no date.

Wong, Y. et al., "Technology Development of a High-Density 32-Channel 16-Gb/s Optical Data Link For Optical Interconnection Applications for the Optoelectronic Technology Consortium (OETC)," Journal of Lightwave Technology, vol. 13, No. 6, (Jun. 1995), pp. 995-1016.

* cited by examiner

METHOD AND APPARATUS PROVIDING AN ELECTRICAL-OPTICAL COUPLER

BACKGROUND OF THE INVENTION

1. Field of the Invention

The present invention relates generally to optical devices and, more specifically, the present invention relates to output couplers.

2. Background Information

Copper wire electrical based interconnects are commonly used when connecting electrical devices over short distances because copper wire electrical based interconnects can be simpler, cheaper and reliable. However, as microprocessor clock frequencies continue to increase, bandwidth limitations for copper wire electrical interconnects on printed circuit boards (PCB) increase due to issues such as signal attenuation, electromagnetic interference (EMI) and crosstalk.

Lasers are well known devices that emit light through stimulated emission and produce coherent light beams with a frequency spectrum ranging from infrared to ultraviolet and may be used in a vast array of applications. In optical communications or networking applications, semiconductor lasers may be used to produce light or optical beams on which data or other information may be encoded and transmitted.

BRIEF DESCRIPTION OF THE DRAWINGS

The present invention is illustrated by way of example and not limitation in the accompanying figures.

DETAILED DESCRIPTION

Methods and apparatuses providing an electrical-optical and/or optical-electrical coupler are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

As will be discussed, embodiments of the present invention provide a coupling device that includes a semiconductor substrate that is patterned and etched, which may be utilized to provide an assembly template for the integration of optical devices such as vertical cavity surface emitting lasers (VCSELs), PIN photodiodes, optical fibers, integrated circuitry and a sealing lid. One advantage of embodiments of coupling devices described herein is the ability to incorporate lithographically defined structures on the semiconductor substrate, which can be used to enable passive alignment of various optical components, such as optical fibers in accordance with the teachings of the present invention.

In one embodiment, a passive alignment packaging technique reduces the need for a precise, time consuming and ultimately expensive closed loop procedure for the alignment of optical components in accordance with the teachings of the present invention. In addition, with the inherently low cost of manufacturing semiconductor materials, such as for example silicon, due to both the built in infrastructure and also the economies of scale, the use of passive alignment techniques to assemble optical modules creates the ability to package very low cost optical coupling assemblies in accordance with the teachings of the present invention. An additional advantage of embodiments of coupling devices according to embodiments of the present invention is the ability to integrate other semiconductor functionality onto the substrate.

As will be discussed, in various embodiments, the semiconductor substrate may contain driver and/or receiver integrated circuitry as well as high-speed micro-strip or co-planar transmission lines to operate at high frequency, and thru vias to connect to a printed circuit board (PCB) underneath. In these embodiments, connectorization may be created by mating the PCB with a connector on a server blade or other PCB board containing ICs or other components. In one embodiment, a coupling device with integrated circuitry according to embodiments of the present invention may also be utilized as a network processor itself or may be utilized in other suitable applications.

Figure 1:
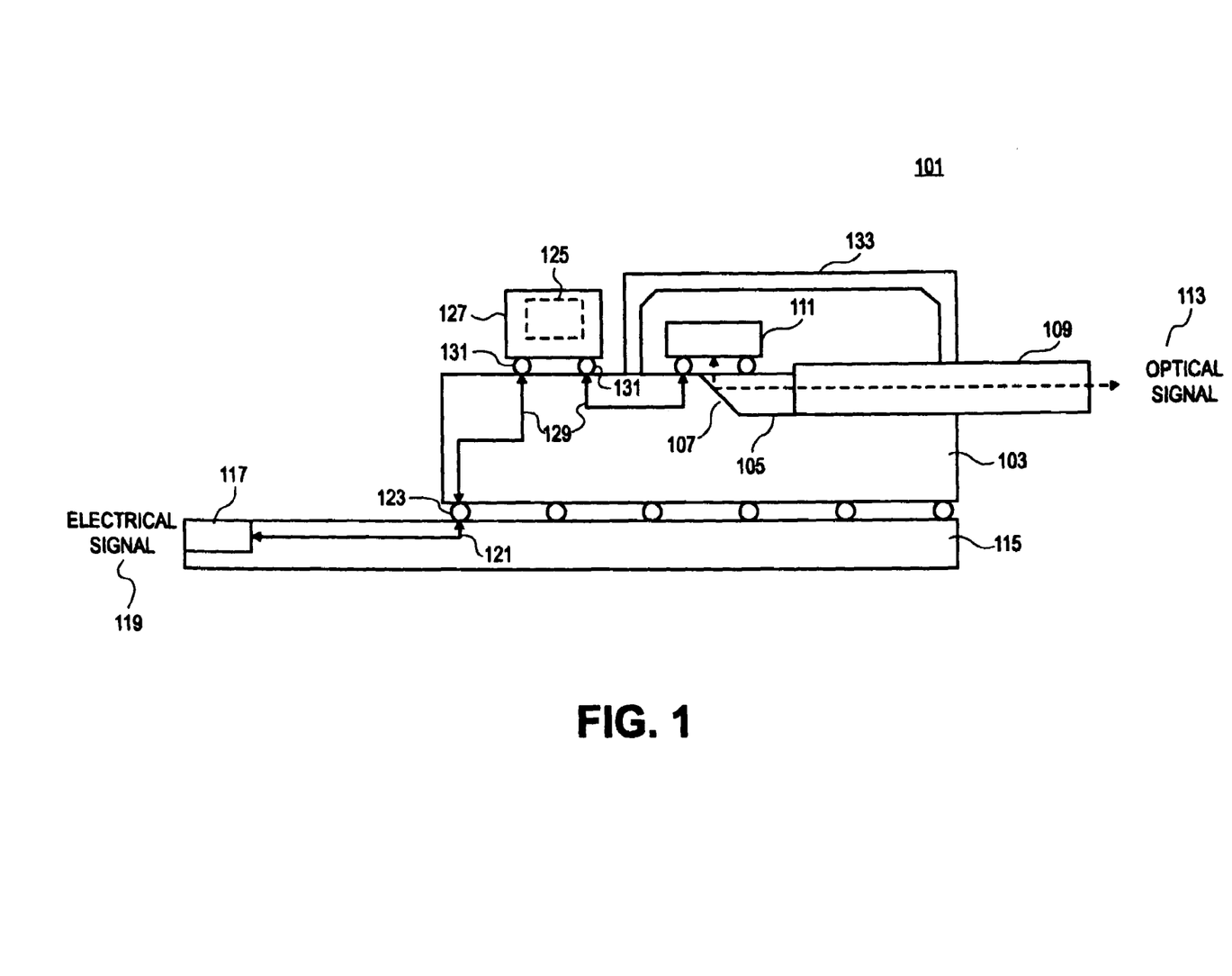
FIG. 1 is a diagram illustrating a cross-section of one embodiment of a coupling device in accordance with the teachings of the present invention.

To illustrate, FIG. 1 is a diagram that shows a cross-section of one embodiment of a coupling device 101 in accordance with the teachings of the present invention. As shown in the depicted embodiment, coupling device 101 includes a first trench 105 that is defined in a first semiconductor substrate 103. A first reflector 107 is defined at a first end of the first trench 105 in the first semiconductor substrate 103. In one embodiment, the first reflector 107 is angled with respect to an axis of the first trench 105. A first optical fiber 109 is disposed in the first trench 105 at a second end of the first trench 105. In one embodiment, first trench 105 is a trench or groove that is etched or defined in semiconductor substrate 103 as a V groove, U groove or the like such that optical fiber 109 is passively aligned in trench 105 when optical fiber 109 is disposed or received in trench 105.

In one embodiment, an optical device 111 is mounted to the first semiconductor substrate 103 proximate to the first trench 105 such that the optical device 111 is optically coupled to the first optical fiber 109 via the first reflector 107. In one embodiment, optical device 111 is an optical source and outputs an optical signal 113 to optical fiber 109 via reflector 107. In another embodiment, optical device 111 is an optical receiver and receives optical signal 113 from optical fiber 109 via reflector 107. In yet another embodiment, a plurality of trenches 105 are defined in semiconductor substrate 103, a corresponding optical fiber 109 is disposed in each respective trench 105 and a corresponding optical device 111 is disposed proximate to a corresponding trench 105 such that an optical beam 109 is transmitted from or received by coupling device 101 through each respective optical fiber 109. Thus, embodiments of optical coupler 101 utilize semiconductor substrate 103 as a packaging substrate for optical device 111 in accordance with the teachings of the present invention.

In an embodiment in which optical device 111 is an optical source, optical device 111 includes a laser, such as for example a VCSEL or other suitable optical source. In an embodiment in which optical device 111 is an optical receiver, optical device 111 includes a photodetector such as for example a PIN photodiode or other suitable optical detector.

As shown in the embodiment of FIG. 1, semiconductor substrate 103 is mounted on a PCB 115. In one embodiment, PCB is made of a glass fiber epoxy laminate such as for example an FR4 material or other suitable material. In one embodiment, PCB 115 includes contacts 117 which are electrically coupled to semiconductor substrate 103. In one embodiment, contacts 117 are electrically coupled to semiconductor substrate 103 through conductors 121 and solder bumps 123 or other suitable electrical connections. In one embodiment, contacts 117 are arranged on PCB 115 so as to provide an edge connector, which in one embodiment is coupled to receive or transmit an electrical signal 119.

In one embodiment, coupling device 101 further includes a circuit 125 included in a second semiconductor substrate 127 that is mounted to the first semiconductor substrate 103. As shown in the depicted embodiment, circuit 125 is electrically coupled between optical device 111 and PCB 115 through conductors 129 and contacts 131. In one embodiment, conductors 129 used to couple optical device 111 and PCB 115 may be implemented using through-hole vias, wire bonds or other suitable electrically conductive structures. In one embodiment, circuit 125 includes circuitry such as for example complementary metal oxide semiconductor (CMOS) drivers and/or control circuit to drive and/or control optical device 111.

For example, in an embodiment in which optical device 111 includes an optical source, circuit 125 is coupled to receive electrical signal 119 and aid optical device 111 in performing an electrical-optical conversion from electrical signal 119 to the appropriate power levels of optical signal 113. In so doing, optical device 111 outputs optical signal 113 in response to electrical signal 119. In one embodiment optical signal 113 is directed from the VCSEL of optical device 111 to reflector 107, which is defined in semiconductor substrate 103 at end of trench 105. Optical signal 113 is then directed from reflector 107 into and through optical fiber 109, which is disposed at the other end of trench 105.

In an embodiment in which optical device 111 includes an optical receiver, optical signal 113 is directed through optical fiber 109 and is optically coupled to be received by the optical receiver of optical device 111 by being reflected from reflector 107. Circuit 125 is coupled to optical device 111 and is adapted to help perform an optical-electrical conversion with optical device 111 to convert optical signal 113 to the appropriate values of electrical signal 119. In so doing, circuit 127 outputs electrical signal 119 at contacts 117 in response to optical signal 113.

As shown in FIG. 1, coupling device 101 also includes a lid 133, which in one embodiment is mounted over semiconductor substrate 103 and encloses optical device 111. In one embodiment, lid 133 protects the enclosed items. In one embodiment, lid 133 provides a hermetic seal for optical device 111 and/or provides EMI shielding, which improves efficiency and performance of coupling device 101 and helps makes possible very highly sensitive links with longer reach with less optical power.

As shown in the illustration, lid 133 in one embodiment also helps to clamp and/or secure optical fiber 109 into first trench 105. With optical fiber 109 secured in first trench 105, optical fiber 109 is passively aligned such that optical signal 113 is properly aligned with optical device 111 via first reflector 107.

Although coupling device 101 is illustrated in the embodiment of FIG. 1 with one optical device 111, one trench 105 and one optical fiber 109, it is appreciated that in another embodiment, a plurality of corresponding optical devices 111, trenches 105 and optical fibers 109 may be included in coupling device 101. For example, in one embodiment, one of the optical devices 111 may be an optical transmitter and another optical device 111 may be an optical receiver. Each optical device 111 is mounted to semiconductor substrate 103 proximate to a respective one of the trenches 105. Each respective trench includes a respective reflector 107 with a respective optical fiber passively aligned in the trench such that optical signals are properly aligned. In such an embodiment, coupling device 101 is adapted to both transmit and receive optical signals 113 and perform the corresponding electrical-optical and/or optical-electrical conversion. In still another embodiment a plurality of optical devices 111 are optical transmitters and/or a plurality of optical devices 111 are optical receivers.

Figure 2:
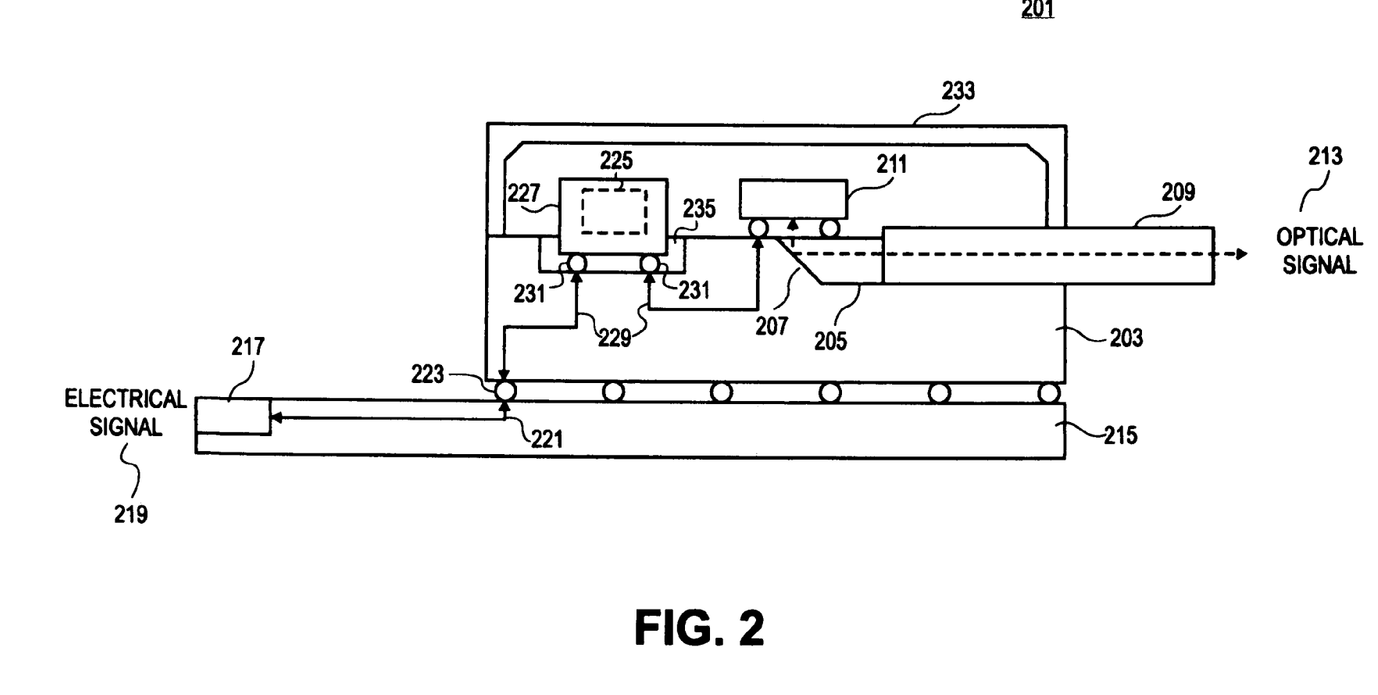
FIG. 2 is a diagram illustrating a cross-section of another embodiment of a coupling device in accordance with the teachings of the present invention.

FIG. 2 is a diagram illustrating a cross-section of another embodiment of a coupling device 201 in accordance with the teachings of the present invention. The embodiment of coupling device 201 illustrated in FIG. 2 shares similarities to the embodiment of coupling device 101 illustrated in FIG. 1. For instance, as shown in the FIG. 2, coupling device 201 includes a first trench 205 defined in a first semiconductor substrate 203. A first reflector 207 is defined in first trench 205 in first semiconductor substrate 203. A first optical fiber 209 is disposed in the first trench 205. In one embodiment, optical fiber 209 is passively aligned in trench 205 when optical fiber 209 is disposed or received in trench 205.

In one embodiment, an optical device 211 is mounted to the first semiconductor substrate 203 such that the optical device 211 is optically coupled to the first optical fiber 209 via the first reflector 207. In one embodiment, optical device 211 is an optical source and outputs an optical signal 213 to optical fiber 209 via reflector 207. In another embodiment, optical device 211 is an optical receiver and receives optical signal 213 from optical fiber 209 via reflector 207.

In one embodiment, semiconductor substrate 203 is mounted on a PCB 215. In one embodiment, PCB 215 includes contacts 217 which are electrically coupled to semiconductor substrate 203 through conductors 221 and solder bumps 223. In one embodiment, contacts 217 provide a connector, which in one embodiment is coupled to receive and/or transmit an electrical signal 219. In one embodiment, coupling device 201 further includes a circuit 225 included in a second semiconductor substrate 227 that is mounted to the first semiconductor substrate 203. Circuit 225 is electrically coupled between optical device 211 and PCB 215 through conductors 229 and contacts 231. In one embodiment, circuit 225 includes circuitry to drive and/or control optical device 211.

As shown in FIG. 2, coupling device 201 also includes a lid 233. In the embodiment depicted in FIG. 2, lid 233 is mounted over substantially all of semiconductor substrate 203 and encloses optical device 211 as well as the second semiconductor substrate 227. In one embodiment, lid 233 protects the enclosed items and provides a hermetic seal and/or provides EMI shielding. In the embodiment depicted in FIG. 2, the second semiconductor substrate 227 is mounted in a trench or opening that has been etched or formed in the first semiconductor substrate 203. In such an embodiment, the overall height of lid 233 may be reduced to accommodate second semiconductor substrate 227.

Figure 3:
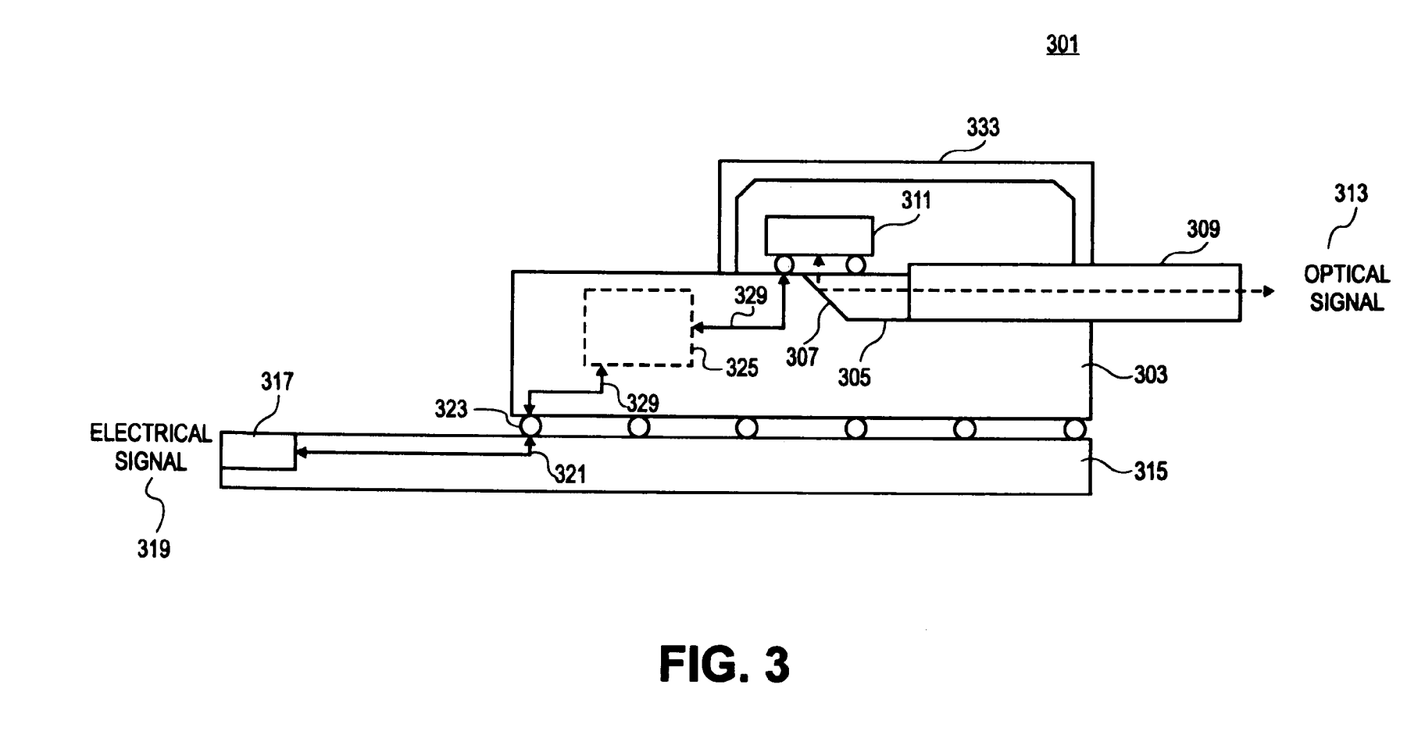
FIG. 3 is a diagram illustrating a cross-section of yet another embodiment of a coupling device in accordance with the teachings of the present invention.

FIG. 3 is a diagram illustrating a cross-section of yet another embodiment of a coupling device 301 in accordance with the teachings of the present invention. The embodiment of coupling device 301 illustrated in FIG. 3 shares similarities the embodiments of coupling devices 101 and 201, examples of which are illustrated in FIGS. 1 and 2. For instance, as shown in the FIG. 3, coupling device 301 includes a first trench 305 that is defined in a first semiconductor substrate 303. A first reflector 307 is defined in first trench 305 in the first semiconductor substrate 303. In one embodiment, the first reflector 307 is angled with respect to an axis of the first trench 305. A first optical fiber 309 is disposed in the first trench 305. In one embodiment, optical fiber 309 is passively aligned in trench 305 when optical fiber 309 is disposed or received in trench 305.

In one embodiment, an optical device 311 is mounted to the first semiconductor substrate 303 proximate to the first trench 305 such that the optical device 311 is optically coupled to the first optical fiber 309 via the first reflector 307. In one embodiment, optical device 311 is an optical source and outputs an optical signal 313 to optical fiber 309 via reflector 207. In another embodiment, optical device 311 is an optical receiver and receives optical signal 313 from optical fiber 309 via reflector 307.

In one embodiment, semiconductor substrate 303 is mounted on a PCB 315. In one embodiment, PCB 315 includes contacts 317 which are electrically coupled to semiconductor substrate 303 through conductors 321 and solder bumps 323. In one embodiment, contacts 317 provide a connector, which in one embodiment is coupled to receive and/or transmit an electrical signal 319.

In one embodiment, coupling device 301 further includes a circuit 325 that is integrated directly into first semiconductor substrate 303. As shown in the embodiment shown in FIG. 3, circuit 325 is electrically coupled between optical device 311 and PCB 315 through conductors 329 and contacts 331. In one embodiment, circuit 325 includes circuitry to drive and/or control optical device 311.

As shown in FIG. 3, coupling device 301 also includes a lid 333. In the embodiment depicted in FIG. 3, lid 333 is mounted over semiconductor substrate 303 and encloses optical device 311. In one embodiment, lid 333 protects the enclosed items and provides a hermetic seal and/or provides EMI shielding.

Figure 4:
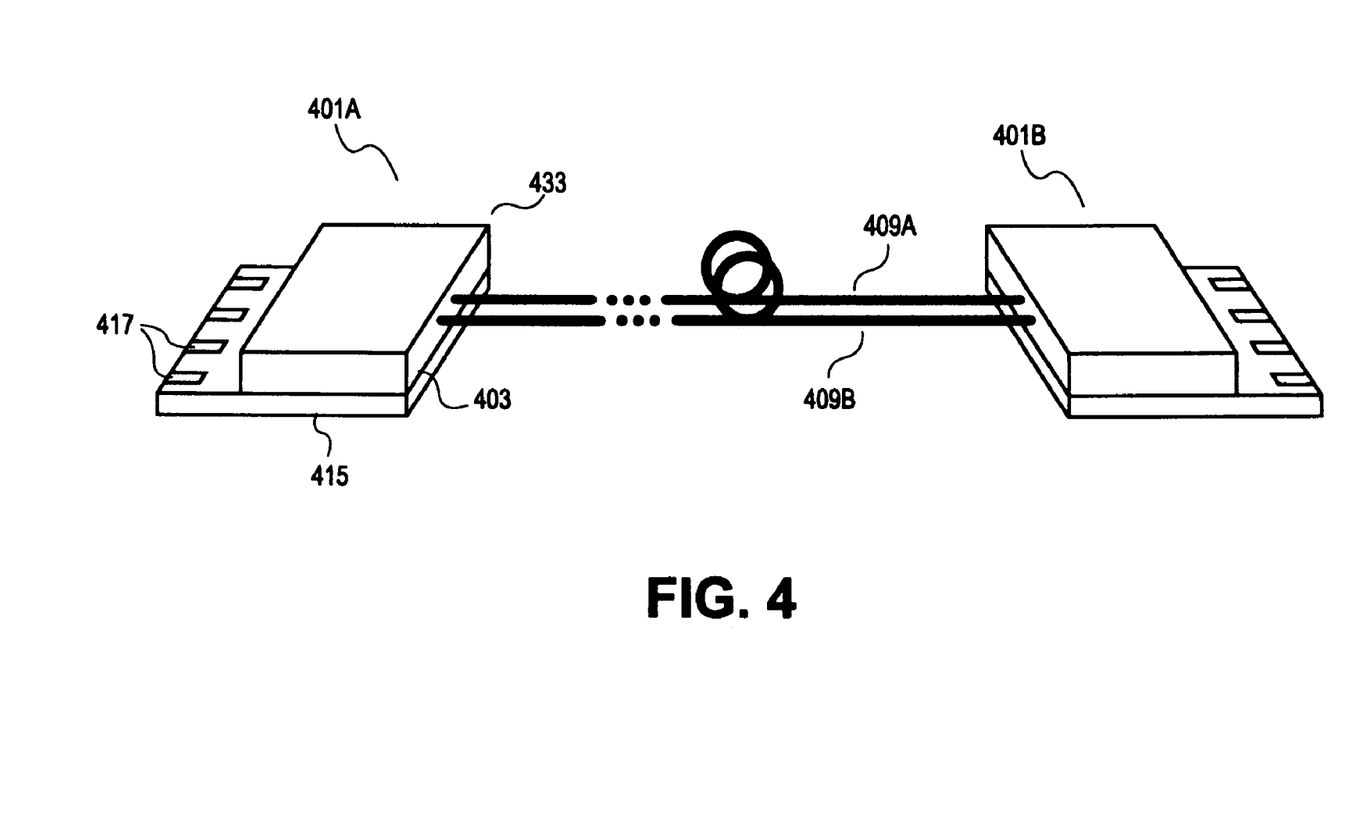
FIG. 4 is a diagram illustrating an embodiment of a plurality of coupling devices coupled to one another accordance with the teachings of the present invention.

FIG. 4 is a diagram illustrating an embodiment of a plurality of coupling devices 401A and 401B coupled to one another in accordance with the teachings of the present invention. In one embodiment, coupling device 401A is substantially similar to coupling device 401B. In one embodiment, coupling devices 401A and 401B are also substantially similar to at least one of the embodiments of coupling devices 101, 201 and/or 301 discussed above. For example, coupling device 401A includes a lid and semiconductor substrate 433 and 403 mounted over a PCB 415 as illustrated in the embodiment of FIG. 4. In one embodiment, contacts 417 are included on PCB 415 to provide an electrical connection to coupler 401A.

In the embodiment illustrated in FIG. 4, coupling devices 401A and 401B are coupled together via a plurality of optical fibers 409A and 409B. In one embodiment, optical fibers 409A and 409B enable a plurality of optical signals or optical beams to be transmitted and received between coupling devices 401A and 401B. In one embodiment, optical fibers 409A and 409B provide a bi-directional optical coupling between coupling devices 401A and 401B.

Figure 5:
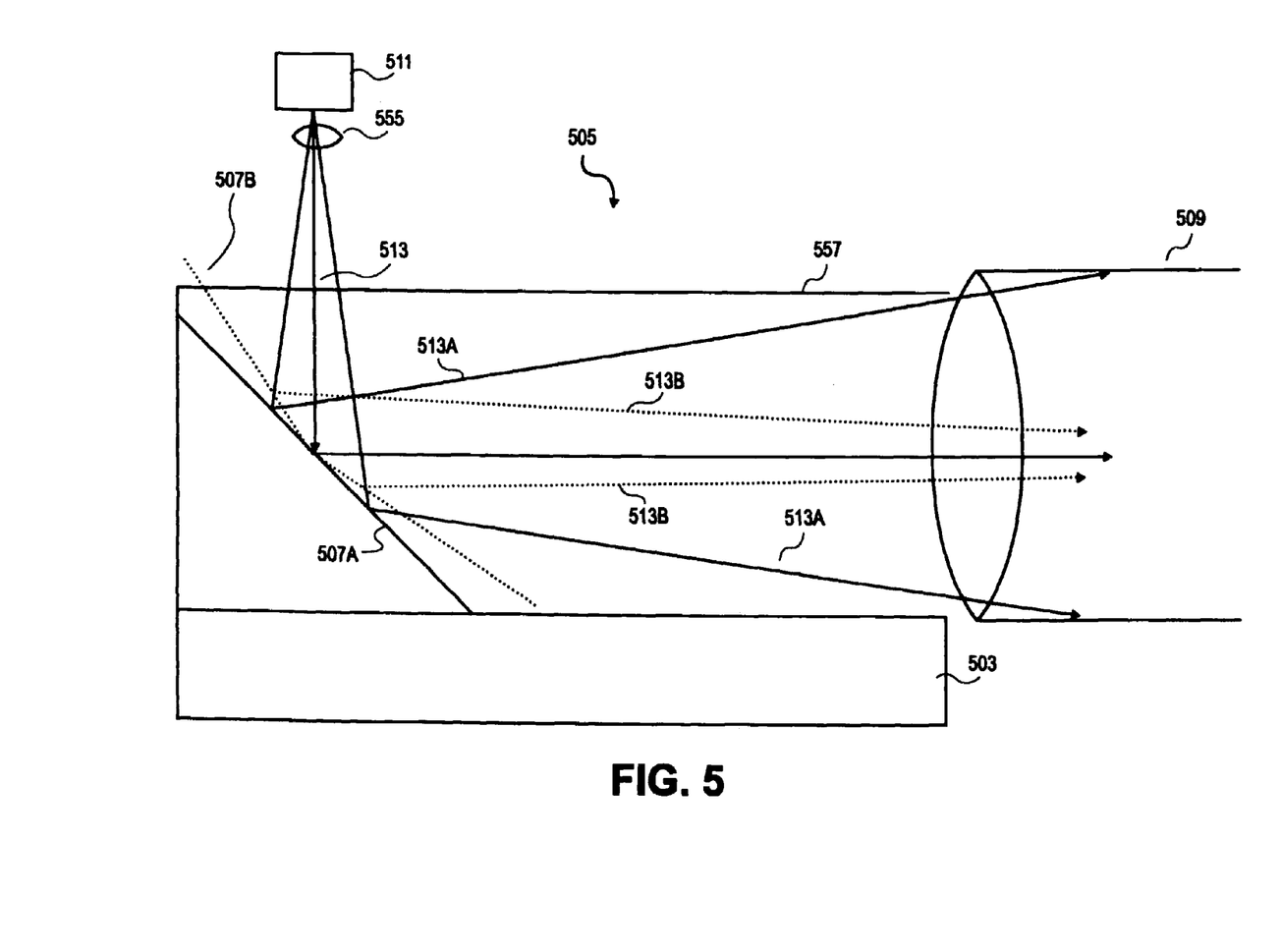
FIG. 5 is a diagram illustrating an embodiment of an optical source optically coupled to an optical fiber via a reflector in accordance with the teachings of the present invention.

FIG. 5 is a diagram illustrating an embodiment of an optical source optically coupled to an optical fiber via a reflector in greater detail accordance with the teachings of the present invention. As shown in the depicted embodiment, trench 505 is defined in semiconductor substrate 503. In one embodiment, a reflector 507A, which is substantially planar, is defined at the end of trench 505. In another embodiment, a reflector 507B, which has a curvature, is defined at a first end of trench 505. In one embodiment, a reflective material, such as for example a metalization and/or other suitable material, is patterned on reflector 507A or 507B to improve the reflectivity of reflector 507A or 507B.

As shown in the depicted embodiment, an optical fiber 509 is disposed in trench 505 at a second end of trench 505. In one embodiment, trench 505 is defined in semiconductor substrate 503 such that optical fiber 509 is passively aligned with trench 505 when optical fiber 509 is disposed in trench 509. In one embodiment, optical device 511 is an optical source, such as for example a VCSEL, and directs an optical signal 513 to reflector 507A or 507B, which is then directed from reflector 507A or 507B to optical fiber 509. As shown in the embodiment of FIG. 5, the optical signals 513A and/or 513B that are reflected from reflectors 507A and/or 507B respectively are directed into optical fiber 509 in accordance with the teachings of the present invention.

In the embodiment shown in FIG. 5, it is noted that optical signal 513 is illustrated as being directed through trench 505 through free space. In other embodiments, it is noted that trench 505 may optionally include one or more of a lens 555, and/or a waveguide 557 and/or other suitable optical elements to optically couple optical device 511 and optical fiber 509.

It is appreciated that although optical device 511 is illustrated as an optical source in FIG. 5, optical device 511 could also be an optical receiver and optical signal 513 could also be directed from optical fiber 509 to optical device 511 via reflector 507A or 507B in accordance with the teachings of the present invention.

Figure 6:
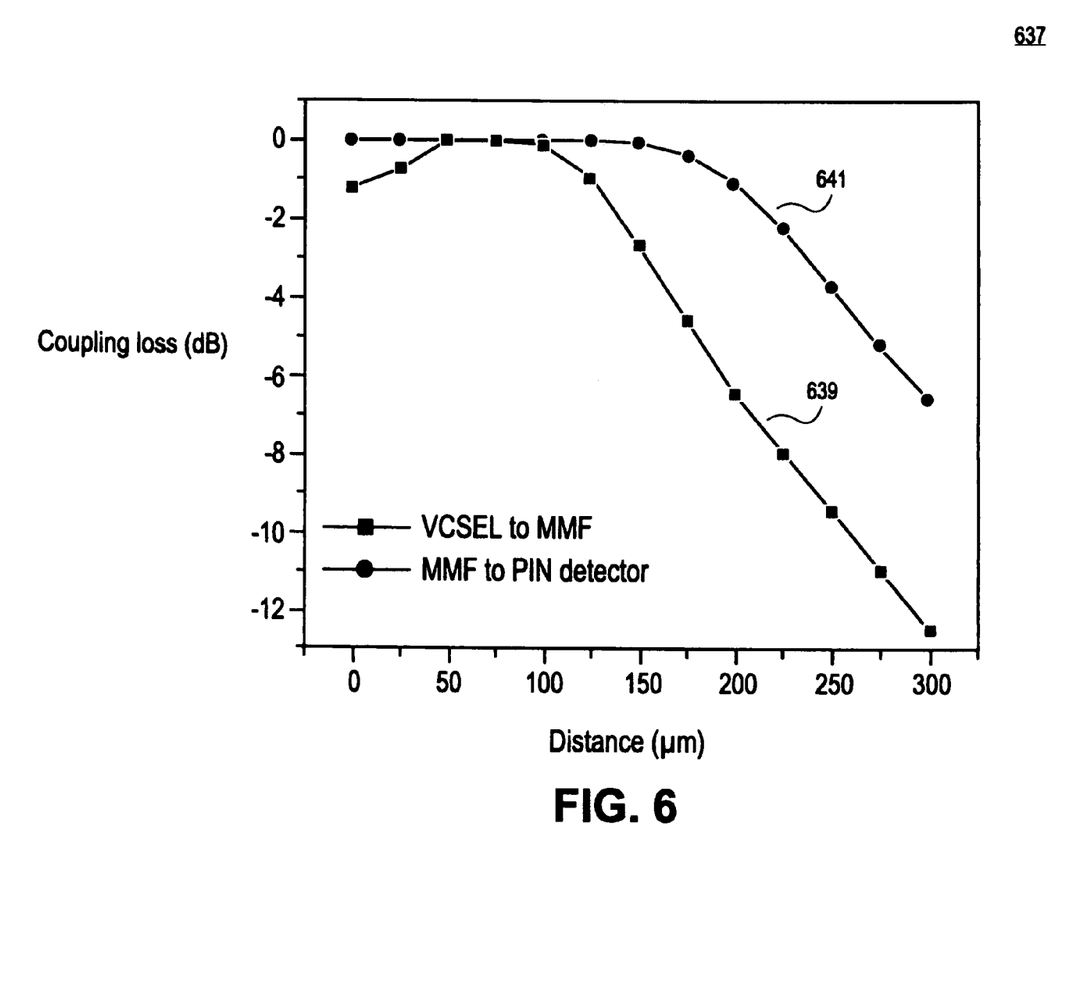
FIG. 6 is a diagram illustrating one embodiment the relationship of coupling loss of an optical source to an optical fiber and one embodiment of coupling loss of an optical fiber to an optical receiver as a function of distance in accordance with the teachings of the present invention.

A technical issue that is addressed with embodiments of the present invention includes the coupling loss between the optical source and the optical fiber and/or the coupling loss between and the optical fiber and the optical receiver. In one embodiment a multimode fiber (MMF) is utilized as the optical fiber. To illustrate, FIG. 6 is a diagram 637 that shows one embodiment of the relationship of coupling loss of an optical source to an optical fiber and one embodiment of coupling loss of an optical fiber to an optical receiver as a function of distance in accordance with the teachings of the present invention. In particular, plot 639 of diagram 637 shows the simulated coupling loss in dB of a VCSEL to a MMF as a function of the optical path distance from the VCSEL to the MMF in μm according to one embodiment of the present invention. Plot 641 of diagram 637 shows the simulated coupling loss in dB of a MMF to a PIN photodetector as a function of the optical path distance from the MMF to the PIN photodetector in μm according to one embodiment of the present invention. As can be observed from plots 639 and 641, there is very little coupling loss for distances that are less than 100 μm.

Another technical issue that is addressed with embodiments of the present invention includes the tolerance to misalignment of the optical components, which depends strongly upon the physical distance between the components. In embodiments of the present invention, the optical beam will diverge quickly and coupling losses are reduced with shorter distances between components as well as tightly parallel apertures. The length of the optical path has two primary components, the horizontal and vertical distance. The vertical distance is primarily determined in embodiments of the present invention by the divergence of the optical beam in order to alleviate shadowing of the light path by the semiconductor substrate or die. The horizontal distance is determined both by the location of the optical aperture with respect to the edge of the semiconductor substrate and also by the assembly tolerance for distance between the die edge and the fiber facet. For a 45° coupling mirror and a VCSEL with a divergence angle of ~14° (typical for an 850 nm MM VCSEL), the optical path length will be ~150 μm; with a similar length for the receive path. Using these values, the sensitivity of the optical path to both angular and lateral misalignment, due to either the die and fiber placement process or the cleave angle of the glass fiber, can be calculated. Analysis shows that at 150 μm, a tilt angle of ±2° results in <1 dB of excess loss.

Figure 7:
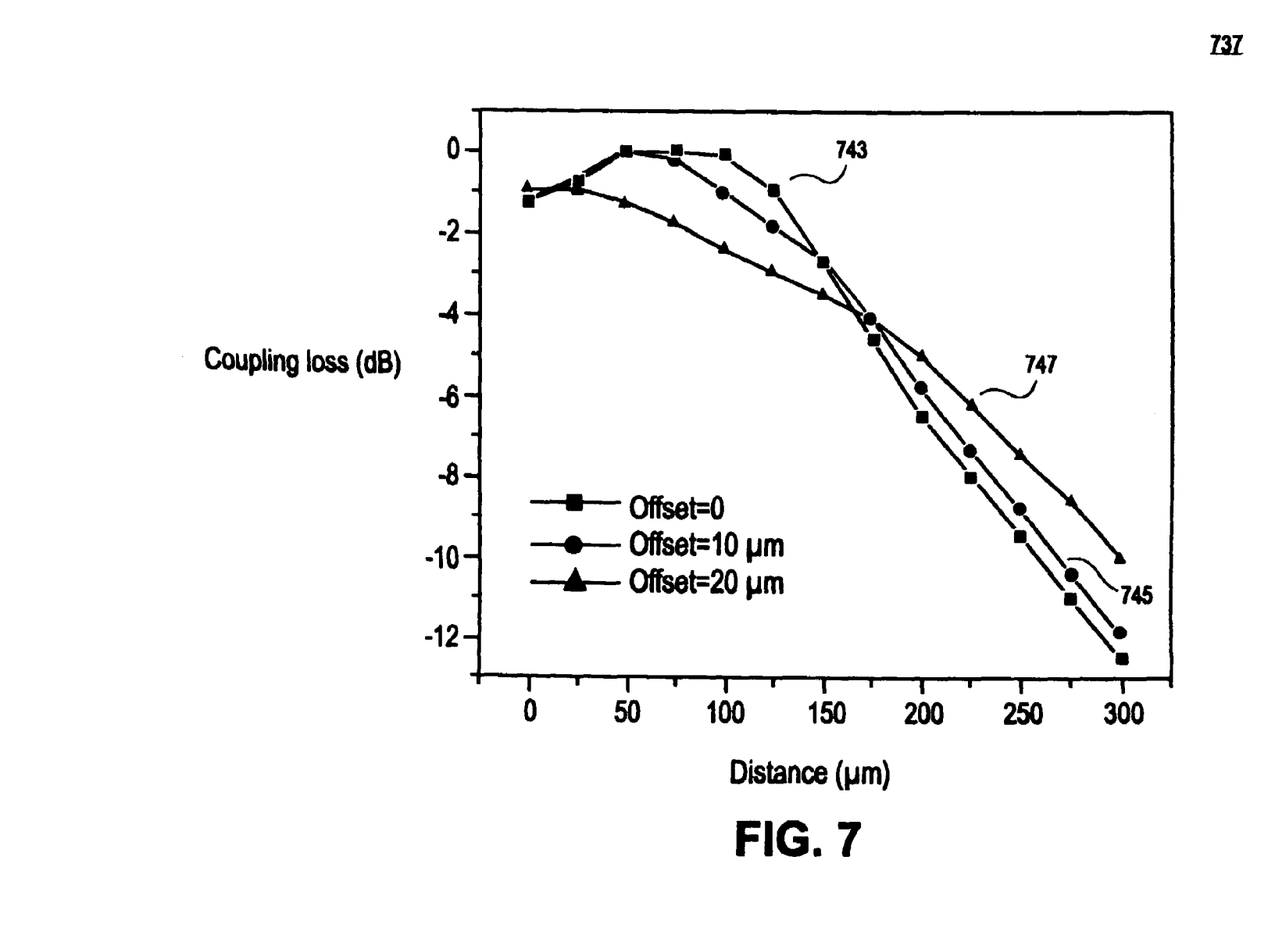
FIG. 7 is a diagram illustrating one embodiment the relationship of coupling loss of an optical source to an optical fiber for a variety of misalignments as a function of distance in accordance with the teachings of the present invention.
Figure 8:
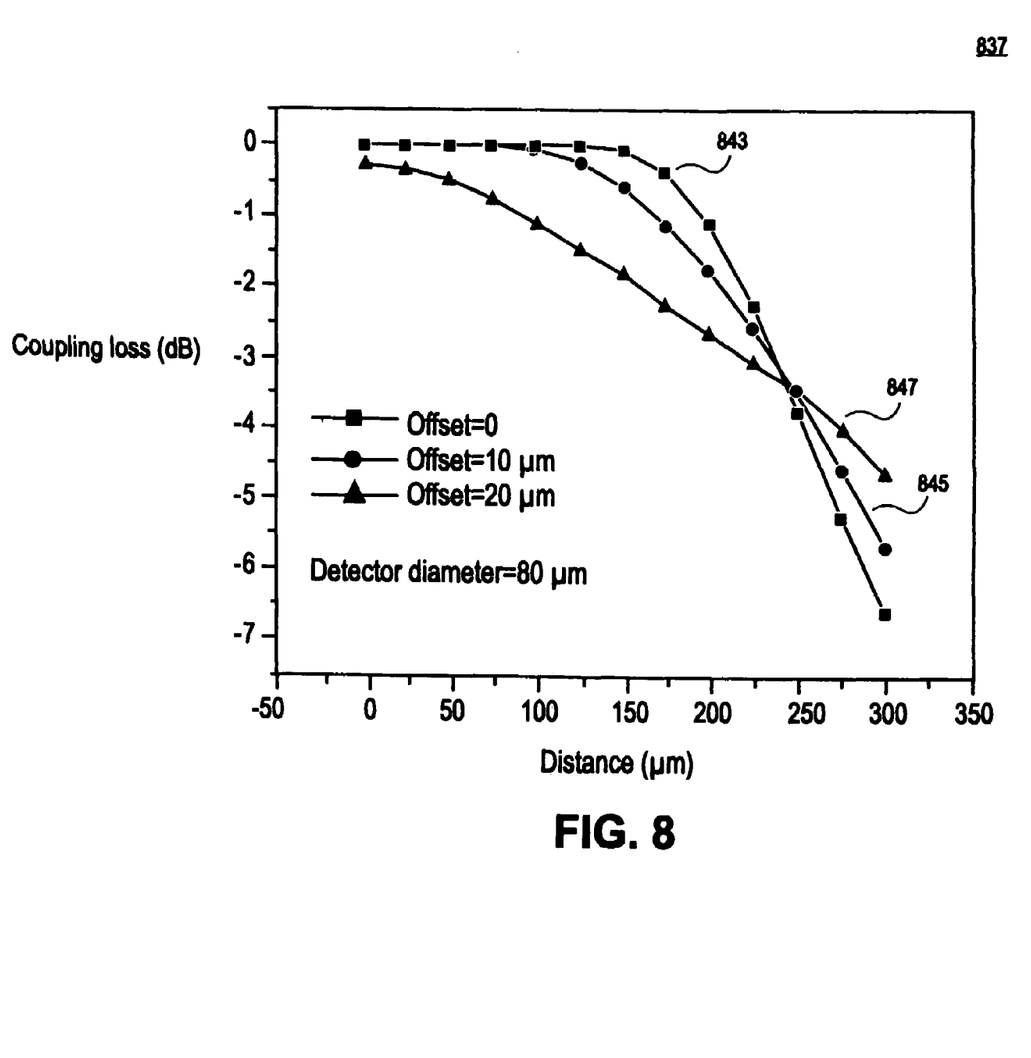
FIG. 8 is a diagram illustrating one embodiment of the relationship of coupling loss of an optical fiber to an optical receiver for a variety of misalignments as a function of distance in accordance with the teachings of the present invention.

To illustrate, FIGS. 7 and 8 are diagrams illustrating embodiments of the relationship of coupling loss of an optical source to an optical fiber and the relationship of coupling loss of an optical fiber to an optical receiver for a variety of misalignments as a function of distance in accordance with the teachings of the present invention. For instance, diagram 737 of FIG. 7 shows the sensitivity of, for example, a multimode 850 nm VCSEL to MMF arrangement to lateral misalignment. In particular, plot 743 shows the simulated coupling loss with an offset equal to zero, plot 745 shows the simulated coupling loss with an offset equal to approximately 10 μm and plot 747 shows the simulated coupling loss with an offset equal to approximately 20 μm.

In the embodiment illustrated in FIG. 8, diagram 837 shows the sensitivity of, for example, a MMF to 80 μm diameter photodiode misalignment. In particular, plot 843 shows the simulated coupling loss with an offset equal to zero, plot 845 shows the simulated coupling loss with an offset equal to approximately 10 μm and plot 847 shows the simulated coupling loss with an offset equal to approximately 20 μm.

In both FIGS. 7 and 8, the diagrams 737 and 837 show that a lateral misalignment of 10 μm or less results in <1 dB of additional coupling loss at a distance of 150 μm according to embodiments of the present invention.

Figure 9:
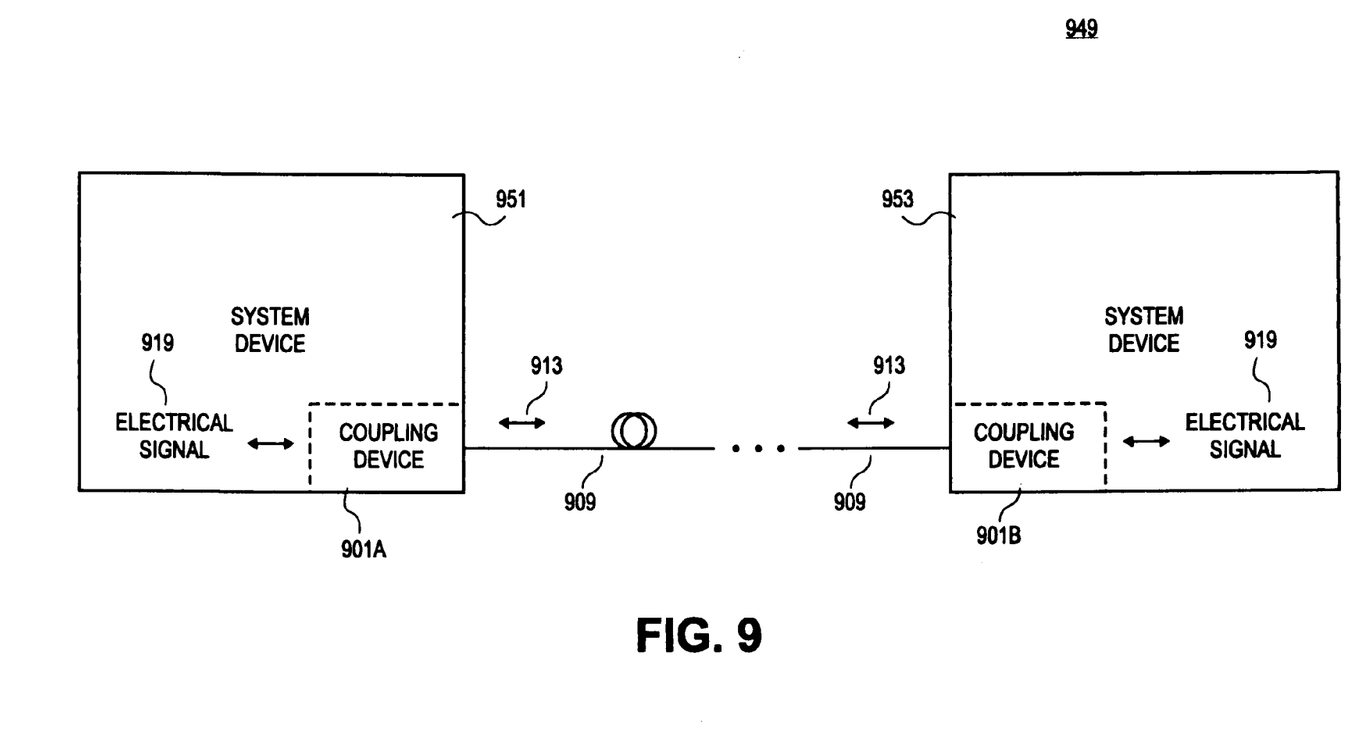
FIG. 9 is a block diagram illustrating one embodiment of a system utilizing a plurality of coupling devices and a plurality of system devices in accordance with the teachings of the present invention.

FIG. 9 is a block diagram illustrating one embodiment of a system utilizing a plurality of coupling devices coupled to a plurality of system devices in accordance with the teachings of the present invention. In particular, system 949 includes a first system device 951 coupled to a second system device 953. System 951 includes a coupling device 901A and system device 953 includes a coupling device 901B. In one embodiment, coupling devices 901A and 901B are substantially similar to at least one of the coupling devices described above. In one embodiment, system devices 951 and 953 are electronic-based and are coupled to one another via an optical fiber 909. In operation, system device 951 generates an electronic signal 919 that is to be transmitted to system device 953. In so doing, the electronic signal 919 is converted to an optical signal 913 in coupling device 901A. Optical signal 913 is directed from coupling device 901A through optical fiber 909 to coupling device 901B. Optical signal 913 is then converted back into the electrical signal 919 in coupler 901B and is then received by system device 953. In one embodiment, communications between system device 951 and 953 may be unidirectional or bi-directional in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
a first trench defined in a first semiconductor substrate;
a first reflector defined at a first end of the first trench in the first semiconductor substrate, the first reflector angled with respect to an axis of the first trench;
a first optical fiber disposed in the first trench at a second end of the first trench;
an optical source mounted to the first semiconductor substrate proximate to the first trench, the optical source optically coupled to the first optical fiber via the first reflector; and
a lid mounted to the first semiconductor substrate, wherein the lid encloses the optical source and clamps the first optical fiber in the first trench.

2. The apparatus of claim 1 wherein the optical source comprises a vertical cavity surface emitting laser.

3. The apparatus of claim 1 further comprising a printed circuit board onto which the first semiconductor substrate is mounted, wherein the printed circuit board includes contacts that are coupled to the optical source.

4. The apparatus of claim 1 wherein the first optical fiber is aligned passively with the first trench.

5. The apparatus of claim 1 further comprising a circuit included in a second semiconductor substrate that is mounted to the first semiconductor substrate, wherein the circuit is electrically coupled to the optical source.

6. The apparatus of claim 5 wherein the lid is adapted to enclose the second semiconductor substrate and the optical source.

7. The apparatus of claim 5 wherein the lid is adapted to provide electromagnetic interference shielding for the second semiconductor substrate and the optical source.

8. The apparatus of claim 1 further comprising a circuit integrated in the first semiconductor substrate, wherein the circuit is electrically coupled to the optical source.

9. The apparatus of claim 1 wherein the first reflector has a curvature.

10. The apparatus of claim 1 wherein the first reflector is substantially planar.

11. The apparatus of claim 1 further comprising a waveguide through which the optical source is optically coupled to the first optical fiber.

12. The apparatus of claim 1 further comprising a lens through which the optical source is optically coupled to the first optical fiber.

13. The apparatus of claim 1, further comprising:
a second trench defined in the first semiconductor substrate;
a second reflector defined at a first end of the second trench in the first semiconductor substrate, the second reflector angled with respect to an axis of the second trench;
a second optical fiber disposed in the second trench at a second end of the second trench;
an optical receiver mounted to the first semiconductor substrate proximate to the second trench, the optical receiver optically coupled to the second optical fiber via the second reflector.

14. An apparatus, comprising:
a first groove etched in a first semiconductor substrate;
a first reflector defined at a first end of the first groove in the first semiconductor substrate, the first reflector angled with respect to an axis of the first groove;
a first optical fiber disposed in the first groove at a second end of the first groove;
an optical receiver mounted to the first semiconductor substrate proximate to the first groove, the optical receiver optically coupled to the first optical fiber via the first reflector; and
a lid mounted to the first semiconductor substrate, wherein the lid encloses the optical receiver and clamps the first optical fiber in the first groove.

15. The apparatus of claim 14 further comprising a printed circuit board onto which the first semiconductor substrate is mounted.

16. The apparatus of claim 14 wherein the first optical fiber is aligned passively with the first groove.

17. The apparatus of claim 14 further comprising a circuit that is electrically coupled to the optical receiver.

18. The apparatus of claim 14, further comprising:
a second groove defined in the first semiconductor substrate;
a second reflector defined at a first end of the second groove in the first semiconductor substrate, the second reflector angled with respect to an axis of the second groove;
a second optical fiber disposed in the second groove at a second end of the second groove; and
an optical source mounted to the first semiconductor substrate proximate to the second groove, the optical source optically coupled to the second optical fiber via the second reflector.

19. A system, comprising:
a first system device including electrical circuitry;
a first coupling device electrically coupled to receive an electrical signal from the first system device, the first coupling device including:
a first trench defined in a first semiconductor substrate, the first trench having a first end and a second end in the first semiconductor substrate;
a first reflector defined at the first end of the first trench in the first semiconductor substrate, the first reflector angled with respect to an axis of the first trench;
a first optical fiber having a first end and a second end, wherein the first end of the first optical fiber is disposed in the first trench at a second end of the first trench; and
an optical source mounted to the first semiconductor substrate proximate to the first trench, the optical source optically coupled to the first optical fiber via the first reflector, the optical source adapted to transmit a first optical signal through the first end of the first optical fiber in response to the first electrical signal;
a lid mounted to the first semiconductor substrate wherein the lid encloses the optical source, and clamps the first optical fiber in the first trench; and
a second system device coupled to the first optical fiber, the second system device to receive the first optical signal from the second end of the first optical fiber.

20. The system of claim 19 wherein the optical source is a vertical cavity side emitting laser.

21. The system of claim 19 wherein the first coupling device further includes:
a second trench defined in the first semiconductor substrate, the second trench having a first end and a second end in the first semiconductor substrate;
a second reflector defined at the first end of the second trench in the first semiconductor substrate, the second reflector angled with respect to an axis of the second trench;
a second optical fiber having a first end and a second end, wherein the first end of the second optical fiber is disposed in the second trench at a second end of the second trench; and
an optical receiver mounted to the first semiconductor substrate proximate to the second trench, the optical receiver optically coupled to the second fiber via the second reflector, the optical receiver adapted to receive a second optical signal from the first end of the second optical fiber, wherein the first system device is adapted to receive a second electrical signal in response to the second optical signal.

22. The system of claim 21 further comprising a circuit included in a second semiconductor substrate mounted on the first semiconductor substrate, the circuit coupled to the optical source and coupled to the optical receiver, the circuit coupled to receive the first electrical signal to transmit the first optical signal from the optical source, the optical receiver coupled to receive the second optical signal to transmit the second electrical signal from the circuit.

23. A method, comprising:
receiving a first electrical signal;
driving, in response to the first electrical signal, an optical source mounted to a first semiconductor substrate and enclosed by a lid mounted to the first semiconductor substrate, to enclose the optical source and clamp a first optical fiber in a first trench, the optical source proximate to the first trench, the first trench defined in the first semiconductor substrate and adapted to direct a first optical signal to a first reflector;
reflecting the first optical signal from the first reflector defined at a first end of the first trench; and directing the optical signal reflected from the first reflector into the first optical fiber disposed in the first trench at a second end of the first trench.

24. The method of claim 23 further comprising:
receiving a second optical signal from a second optical fiber disposed in a second trench defined in the first semiconductor substrate at a second end of the second trench;
reflecting the second optical signal from a second reflector defined at a first end of the second trench in the semiconductor substrate; and
converting the second optical signal reflected from the second reflector into a second electrical signal.

25. The method of claim 23 wherein the first electrical signal is received with a circuit disposed in a second semiconductor substrate mounted on the first semiconductor substrate.

26. The method of claim 25 wherein the first optical fiber is aligned passively with the first trench.

* * * * *